(12) United States Patent
Aizawa et al.

(10) Patent No.: US 7,317,315 B2
(45) Date of Patent: Jan. 8, 2008

(54) MAGNETIC AZIMUTH MEASUREMENT APPARATUS

(75) Inventors: Manabu Aizawa, Miyagi (JP); Hiroshi Ohnuma, Miyagi (JP)

(73) Assignee: Sony Corporation, Tokyo (JP)

( * ) Notice: Subject to any disclaimer, the term of this patent is extended or adjusted under 35 U.S.C. 154(b) by 188 days.

(21) Appl. No.: 10/685,924

(22) Filed: Oct. 15, 2003

(65) Prior Publication Data

US 2004/0135576 A1    Jul. 15, 2004

(30) Foreign Application Priority Data

Oct. 18, 2002    (JP)    ............................ P2002-304990

(51) Int. Cl.
*G01R 33/02*    (2006.01)
*G01R 33/04*    (2006.01)

(52) U.S. Cl. ...................................... 324/247; 324/253

(58) Field of Classification Search ................ 324/244, 324/245, 247, 249, 253, 254, 258, 260, 261; 33/271, 300, 355, 361

See application file for complete search history.

(56) References Cited

U.S. PATENT DOCUMENTS

| | | | | |
|---|---|---|---|---|
| 2,389,146 A | * | 11/1945 | Curry, Jr. et al. ............ | 324/253 |
| 3,825,823 A | * | 7/1974 | Rovner ........................ | 324/247 |
| 4,373,271 A | * | 2/1983 | Nitz ............................. | 33/361 |
| 4,413,424 A | * | 11/1983 | Sasaki et al. ................. | 33/361 |
| 4,616,424 A | * | 10/1986 | Arakawa et al. .............. | 33/361 |
| 4,739,263 A | * | 4/1988 | Mohri et al. ................. | 324/247 |
| 4,763,072 A | * | 8/1988 | Katoh et al. ................. | 324/253 |
| 5,028,280 A | * | 7/1991 | Ihara et al. .................. | 148/306 |
| 5,046,260 A | * | 9/1991 | Wellhausen .................. | 33/356 |
| 5,131,155 A | * | 7/1992 | Takano et al. ................ | 33/356 |
| 5,161,311 A | * | 11/1992 | Esmer et al. ................. | 33/356 |
| 5,199,178 A | * | 4/1993 | Tong et al. ................... | 33/361 |
| 6,407,547 B1 | * | 6/2002 | Yamada et al. ............. | 324/253 |
| 2003/0169039 A1 | * | 9/2003 | Kang et al. .................. | 324/260 |

OTHER PUBLICATIONS

Internet Pulication on Permalloy, pubished by Ohtama at www.ohtama.co.jp/eng/tech, date unknown, entire page.*

* cited by examiner

*Primary Examiner*—Reena Aurora
*Assistant Examiner*—Kenneth J Whittington
(74) *Attorney, Agent, or Firm*—Sonnenschein Nath & Rosenthal LLP

(57) ABSTRACT

A magnetic azimuth measurement apparatus without arithmetic means nor any mechanical motion such as rotation, not affecting its mass production ability because of a simple configuration, and making it possible to measure a azimuth in higher precision, is provided. A trigger signal generates if a condition determining circuit detects that a switched output signal reaches a maximum (positive peak), and this trigger signal enables an output interface circuit to hold a switching signal. The switching signal held by the output interface circuit is a digital representation of a detection coil position parallel to an external magnetic field. Accordingly, it is possible to obtain the azimuth of the external magnetic field with respect to the sensor device.

10 Claims, 19 Drawing Sheets

MAGNETIC CORE B - H CHARACTERISTIC

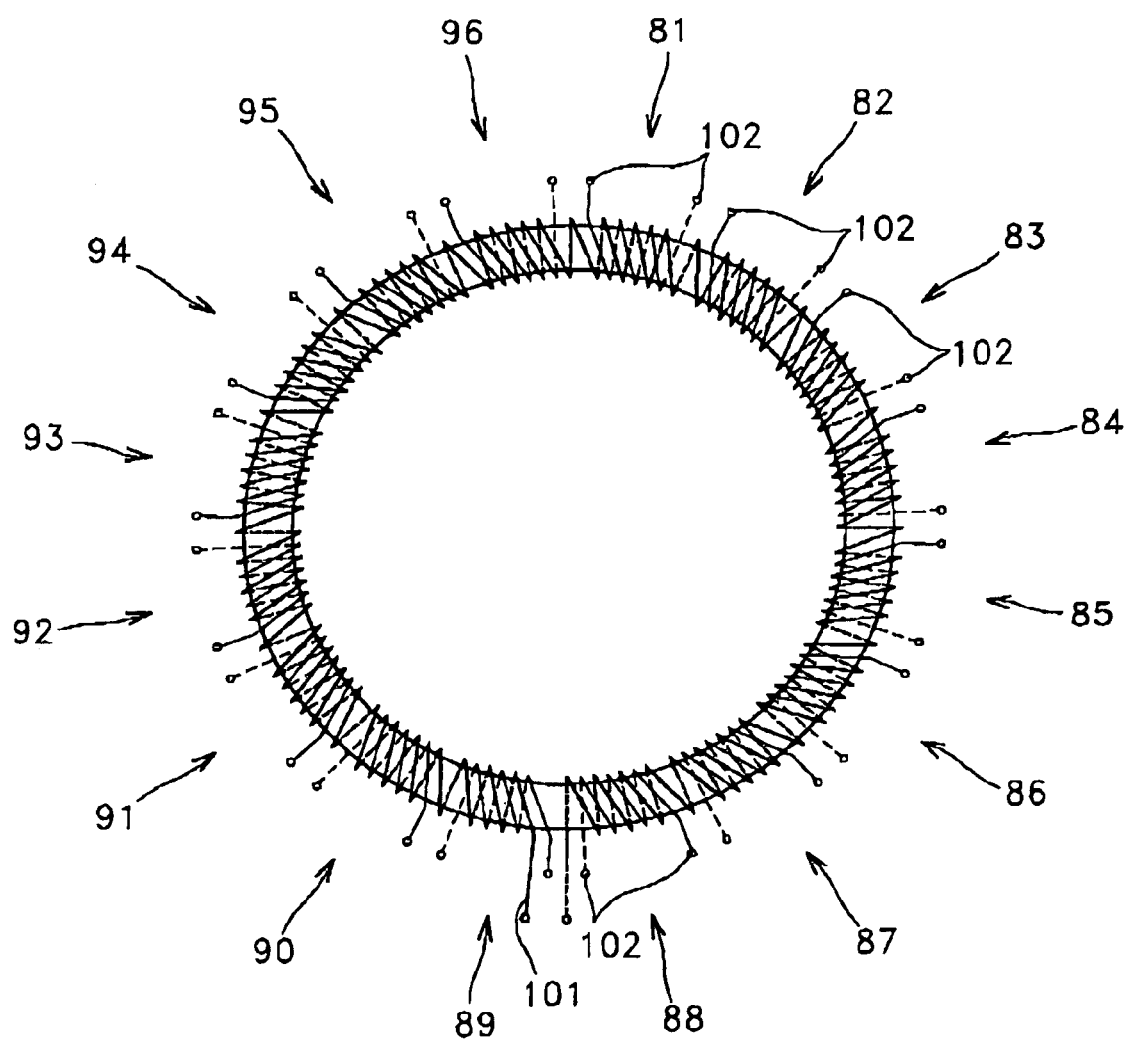

102  101
UPPER COIL

CORE 101  102
LOWER COIL

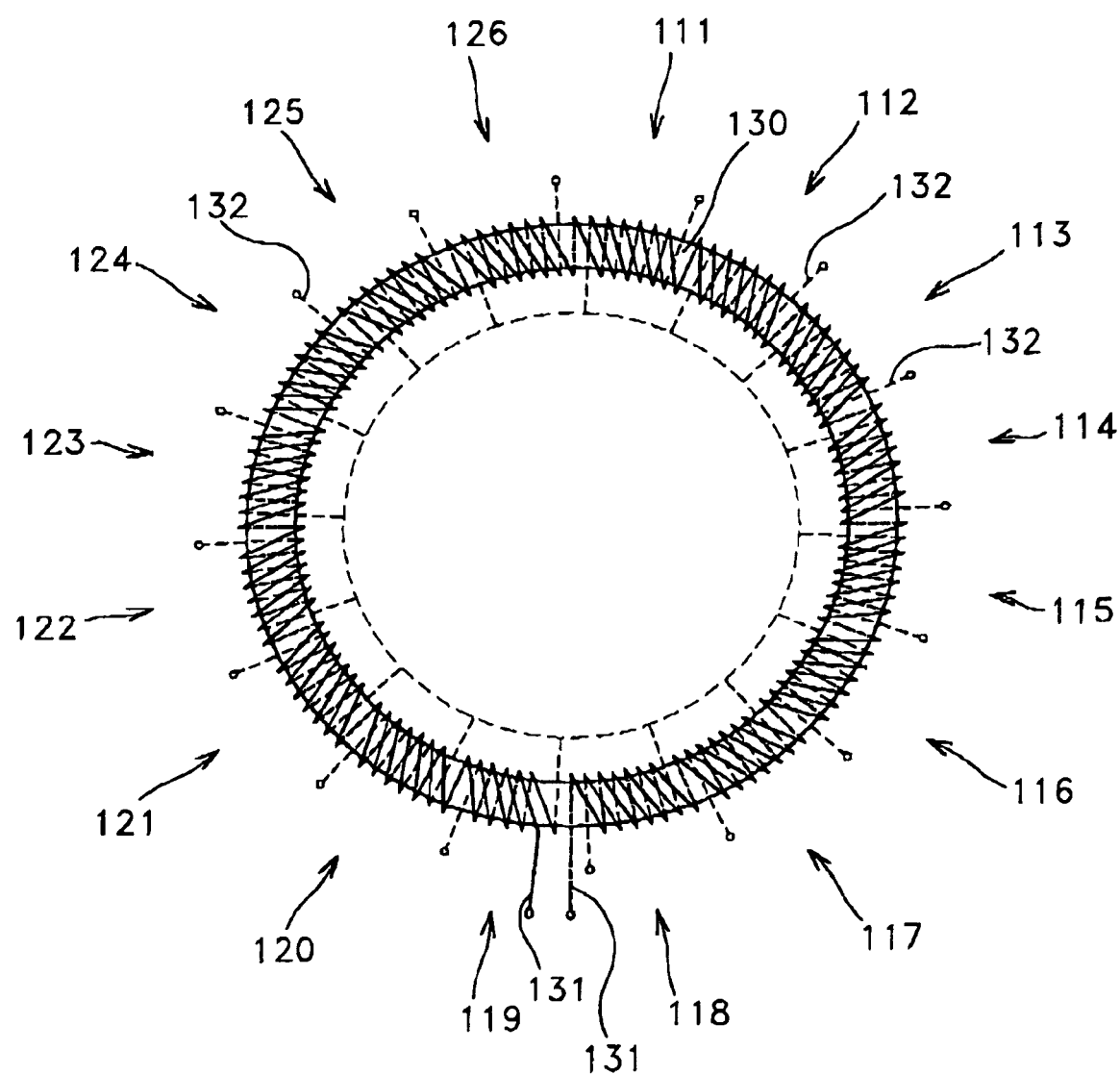

UPPER COIL

CORE

LOWER COIL

MAGNETIC AZIMUTH MEASUREMENT APPARATUS

CROSS REFERENCES TO RELATED APPLICATIONS

The present invention claims priority to its priority document No. 2002-304990 filed in the Japanese Patent Office on Oct. 18, 2002, the entire contents of which being incorporated by reference herein.

BACKGROUND OF THE INVENTION

1. Field of the Invention

The present invention relates to a magnetic azimuth measurement apparatus which measures a azimuth of earth magnetism.

2. Description of the Related Art

To obtain an azimuth between an external-field such as the earth magnetism and a magnetic sensor device, there is mainly used a conventional method in which directional magnetic sensor devices X161 and Y162 as shown in FIG. 20 are arranged so as to have an orthogonal relationship of 90°, so that two outputs, Xout and Yout, obtained therefrom via a detection/amplifier circuit 163, maybe used as a basis for determining the azimuth In other words, since outputs of the individual sensors (Xout and Yout) regarding the azimuth $\theta$ are expressed by formulas (1) and (2) below because of their directional and positional relationship. the outputs change in sine waveforms with a 90° phase offset (waveforms are shown in FIG. 21).

$$X\text{out}0 = \cos(\theta) \quad (1)$$

$$Y\text{out}0 = \sin(\theta) \quad (2)$$

From formulas (1) and (2), a formula (3) is obtained.

$$\theta_0 = \text{Tan}^{-1}(Y\text{out}0/X\text{out}0) = \text{Tan}^{-1}(\sin\theta/\cos\theta) \quad (3)$$

The azimuth $\theta_0$ can be calculated from the formula (3).

However, because $\text{Tan}^{-1}$ has discontinuous points, $\theta_0$ needs to be corrected according to the following condition:

Condition:

If $X\text{out} \geq 0$ and $Y\text{out} \geq 0$, then $\theta = \theta_0$

If $X\text{out} < 0$, then $\theta = \theta_0 + 180°$

If $X\text{out} \geq 0$, $Y\text{out} < 0$, then $\theta = \theta_0 + 360°$ (4)

An example of the related art is disclosed in Japanese Patent Laid-open Publication 8-201060.

It should be pointed out that it is difficult to obtain the above-mentioned $\text{Tan}^{-1}$ in analog terms (in terms of circuit), hence, it is necessary to carry out calculation by using a microcomputer 164 or the like shown in FIG. 22. Consequently, a system requires an A/D converter 165 which converts an analog output from a sensor to a digital value. Further, because $\text{Tan}^{-1}$ is a nonlinear function, for carrying out its numerical operation, it is necessary to use a large capacity memory 166 such as a numerical table and the microcomputer 164 having a high computational capacity.

SUMMARY OF THE PRESENT INVENTION

However, according to a conventional method, it is necessary to configure a complex, large-scale system in addition to sensors for obtaining azimuth information.

Furthermore, in practice, signals outputted from the sensors may be expressed as in the following equations due to the effects of scattering of individual devices/circuits and an environment.

$$X\text{out} = Ax \times \cos(\theta) + Ox \quad (1)'$$

$$Y\text{out} = Ay \times \cos(\theta) + Ox \quad (2)'$$

where Ax, Ay are amplitudes Ox, Oy are offset voltages. From the above formulas, the following formula is obtained.

$$\theta = \text{Tan}^{-1}((Ay \times \sin(\theta) + Oy)/(Ax \times \cos(\theta) + Ox)) \quad (3)'$$

As a result of the effects of amplitude, offset and so on, there exists an error between the actual azimuth and $\theta$. For correcting this error and carrying out azimuth measurement with higher accuracy, it is necessary to perform calibration by rotating the sensors. However, the rotation must be carried out under a predetermined condition, thereby requiring highly cumbersome work, and in some cases, adversely affecting the characteristics even further. Moreover, it is necessary to set up additional operation mode in the system for controlling the calibration, thereby aggravating complications. In the end, to solve all these difficulties and improve directional accuracy, thorough control of data scatterings within the sensor units and within the circuits is required, thus affecting the efficiency for mass production.

The present invention is made in view of the above-mentioned circumstances to meet a need of providing a magnetic azimuth measurement apparatus which does not require an arithmetic unit and mechanical motion such as rotation, has a simple construction that does not prevent its mass production, and enables the azimuth measurement in higher precision.

For meeting the above-mentioned need, a magnetic azimuth measurement apparatus according to one embodiment of the present invention includes a magnetic detection unit including two or more magnetic detection devices, which have directionality and are placed at equal intervals based on a predetermined rule in such a way that their directionalities are different from each another; a sampling unit for sequentially switching and sampling electromagnetic conversion outputs of magnetic detection devices of the magnetic detection unit; a condition determining unit for determining whether or not the electromagnetic conversion output, which is subjected to sequential switching and sampling by the sampling unit, meets a predetermined condition; and a azimuth information output unit for outputting magnetic azimuth information based on a result of determination according to the condition determining unit.

The magnetic azimuth measurement apparatus of such configuration operates as follows. The electromagnetic conversion outputs from magnetic detection devices of the magnetic detection unit are subjected to sequential switching and sampling by the sampling unit. Determination is made on whether or not the electromagnetic conversion output subjected to sequential switching and sampling by the sampling unit meets the predetermined condition. Based on the result of determination, the azimuth information output unit outputs magnetic azimuth information.

BRIEF DESCRIPTION OF THE DRAWINGS

The above and other objects, features and advantages of the present invention will become more apparent from the following description of the presently preferred exemplary embodiment of the invention taken in conjunction with the accompanying drawing, in which:

FIG. 12 is an external view of another embodiment of a second magnetic detection device group;

FIG. 15 is an external view of another embodiment of a third magnetic detection device group;

DETAILED DESCRIPTION OF THE EMBODIMENTS

Figure 1:
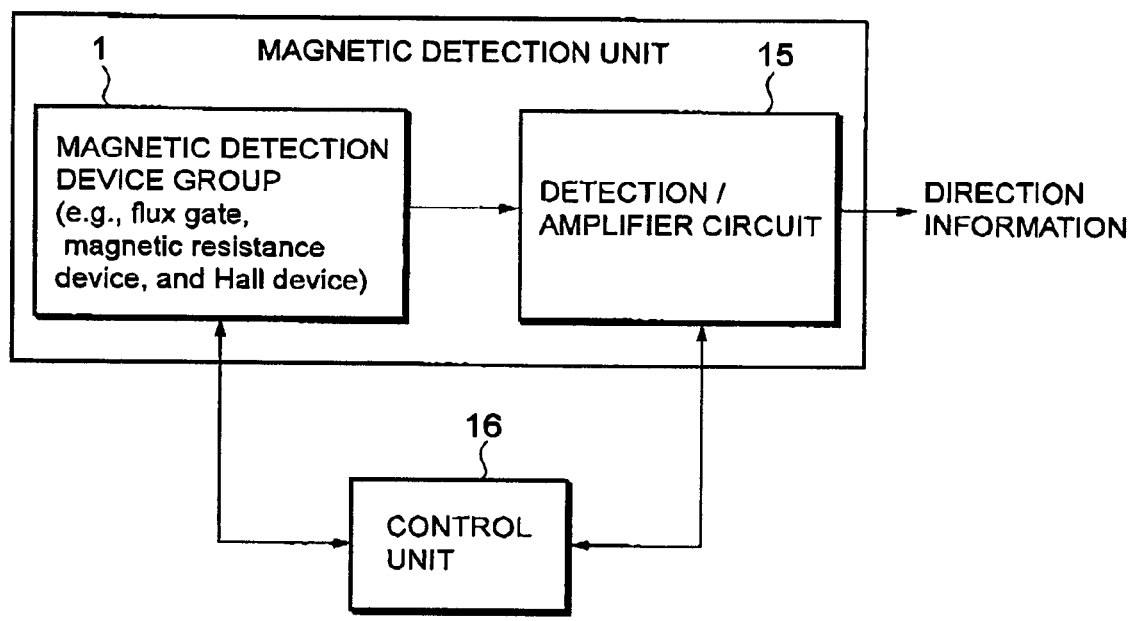
FIG. 1 is a schematic block diagram showing a configuration of a magnetic azimuth measurement apparatus according to an embodiment of the present invention.

Below, embodiments according to the present invention will be described. Referring to a schematic representation of FIG. 1, a magnetic azimuth measurement apparatus includes a magnetic detection device group 1 consisting of, for example, 16 magnetic detection devices having directionality. The measurement apparatus allows to sequentially switch and obtain an electromagnetic conversion output of each magnetic detection device of the magnetic detection device group 1 by means of a detection/amplifier circuit 15. If sampled electromagnetic conversion outputs meet a predetermined condition, the measurement apparatus generates azimuth information of the external magnetic field.

For the magnetic detection device group 1, as described later, a flux gate type, a magnetoresistive device, a Hall device and the like may be used. The magnetic detection device group 1 and the detection/amplifier circuit 15 constitute a magnetic detection unit.

A control unit 16 obtains an excitation signal to excite an excitation coil (to be explained later) of the magnetic detection device group 1 and an electromagnetic conversion output of each magnetic detection device by means of the detection/amplifier circuit 15, generates a control signal in order to output the azimuth information, and supplies it to each unit.

It should be noted that in the present embodiment, the number of magnetic detection devices is set to 16 for the sake of explanation. It is preferable to have two or more magnetic detection devices. The number of the magnetic detection devices may be 3, 4, 5, 6, 7 to 15, or 17, 18, 19 ... 24 ... 30. Further, the number may be 31 or more. Further, The number may be $2^n$ (n is an integer equal to 1 or more). Specifically, the number may be 2, 4, 8, 16, 32, 64, 128, and 256. The more magnetic detection devices, the more precisely magnetic azimuth measurement may be performed.

In the present embodiment, for example, 16 magnetic detection devices of the magnetic detection device group 1 are arranged at equal intervals, for example, on the circumference based on a predetermined rule, so that their directionality differs from one another. In other words, the magnetic detection device group 1 has characteristics in the way the magnetic detection devices are arranged and the way the excitation coil and detecting coil to be explained later are wound. Details of the magnetic detection device group 1 will be covered later.

Next, referring to FIG. 2, configuration of the magnetic azimuth measurement apparatus will be described in detail. Specifically, detailed configuration of a part corresponding to the detection/amplifier circuit 15 and a part corresponding to the control unit 16 will be described. For the sake of explanation, it is assumed that a flux gate system, which is known technique as a method of converting the earth magnetism into electric signals, is used with 16 magnetic detection devices. For converting the earth magnetism into electric signals, there are other systems available (for example, a magnetoresistive device system and a Hall device system). Further, it is possible to alter the number of detection devices to the number other than 16. A part corresponding to the detection/amplifier circuit 15 of FIG. 1 includes a switching circuit 2, a synchronous detection circuit 5, an amplifier circuit 6, a condition determining circuit 8, and an output interface circuit 9. Furthermore, a part corresponding to the control unit 16 includes an oscillator 11, a divider circuit 12, and a drive circuit 13.

Figure 2:
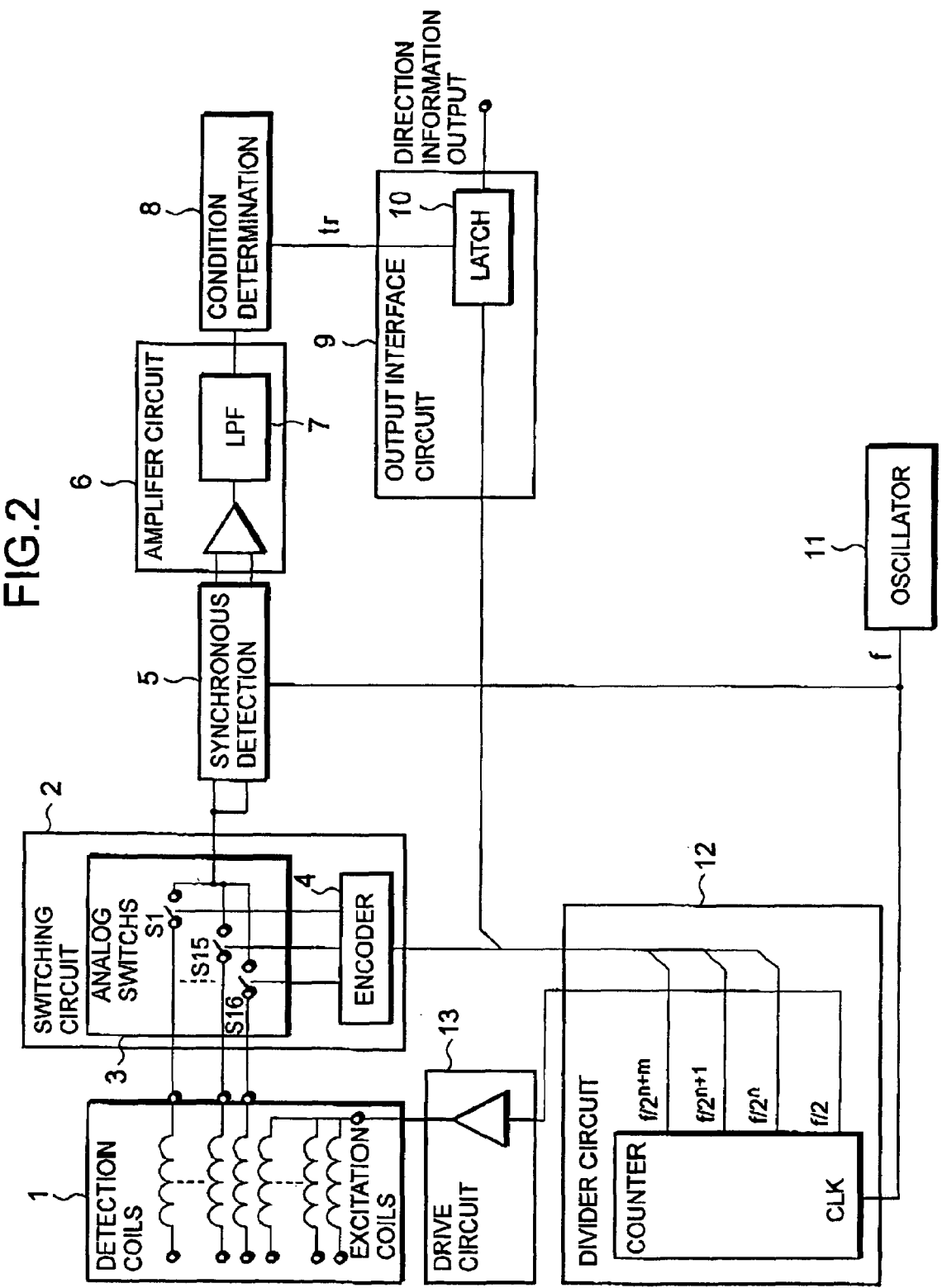
FIG. 2 is a circuit diagram showing a detailed configuration of a magnetic azimuth measurement apparatus.

In FIG. 2, an inductive voltage signal, which is a detection output from 16 magnetic detection devices of the magnetic detection device group 1, is supplied to an electronic switch unit 3 of the switching circuit 2. The electronic switch unit 3 has 16 electronic switches S1, ... , S15 and S16, and receives detection outputs from the 16 magnetic detection devices. The 16 electronic switches of the electronic switch unit are switched sequentially per a predetermined cycle in accordance with a digital output of an encoder 4 in the switching circuit and supplies a switched inductive voltage signal to the synchronous detection circuit 5.

The synchronous detection circuit 5 carries out synchronous detection of the inductive voltage signal at a frequency twice of the excitation signal and supplies it to the amplifier circuit 6. The amplifier circuit 6 amplifies the inductive voltage signal, which is subjected to synchronous detection, to a level large enough for signal processing in the following circuit signal, removes a high-frequency component by a LPF 7, and supplies it to the condition determining circuit 8.

The switching circuit 2 and the synchronous detection circuit 5 constitute a sampling unit for switching the electromagnetic conversion output of each magnetic detection device one to the other, and subjecting a switched signal to synchronous detection by means of a predetermined frequency and sampling a voltage change corresponding to the external magnetic field strength.

The condition determining circuit 8 generates a trigger signal tr if an output waveform from the amplifier 6 satisfies a predetermined condition (for example, a maximum) and supplies it to an output interface circuit 9. For example, a minimum or a zero crossing in the above-mentioned output waveform may be set as the predetermined condition.

The output interface circuit 9 holds a switching signal (digital) by means of the trigger signal tr generated by the condition determining circuit 8, for example, detects peak, and outputs it to make up azimuth information. Further, timing adjustments and the like are carried out for outputting the azimuth information to an external equipment.

The oscillator 11 generates a signal to be supplied via the drive circuit 13 to the excitation coil of the magnetic detection device group 1, a signal to be supplied to the switching circuit 2 for switching the electronic switch unit 3, and a signal of frequency f which is supplied to the synchronous detection circuit 5 to serve as a base of a control signal for the synchronous detection.

The divider circuit 12 divides a signal of frequency f from the oscillator 11 into f/2 and supplies it to the drive circuit 13. Further, by dividing the signal of frequency f into $f/2^n$, $f/2^{n+1}$ ... $f/2^{n+m}$, for example, a hexadecimal counter is constituted, thereby supplying a number sequence 1, 2 ... 16 to each of electronic switches S1-S16 of the electronic switch unit 3 via the encoder 4.

The drive circuit 13 drives the excitation coils of the magnetic detection device group 1 by using the f/2 signal from the divider circuit 12. The excitation coil, as explained later, may be set up for each magnetic detection device or commonly for all of the magnetic detection devices.

The switching circuit 2, if the divider circuit 12 constitutes the hexadecimal counter, receives the number sequence 1, 2 ... 16 based on the signals of $f/2^n$, $f/2^{n+1}$ ... $f/2^{n+m}$, and converts it to a digital output for switching the electronic switches of the electronic switch unit 3 by the encoder 4.

Since data of the number sequence 1, 2 ... 16 converted by the encoder 4 is in one-to-one correspondence to a sensor output of each of the electronic switches S1-S16, it corresponds to the position (azimuth) of individual detecting coil. Namely, the sensor output signal subjected to sequential switching becomes a value digitally representing an azimuth of an external magnetic field of a timing which became a set condition to be determined by the condition determining circuit. Use of this digital value makes it possible to obtain the azimuth of the external magnetic field.

Now, a configuration and operating principle of an embodiment of the magnetic detection device group 1 will be described.

Figure 3:
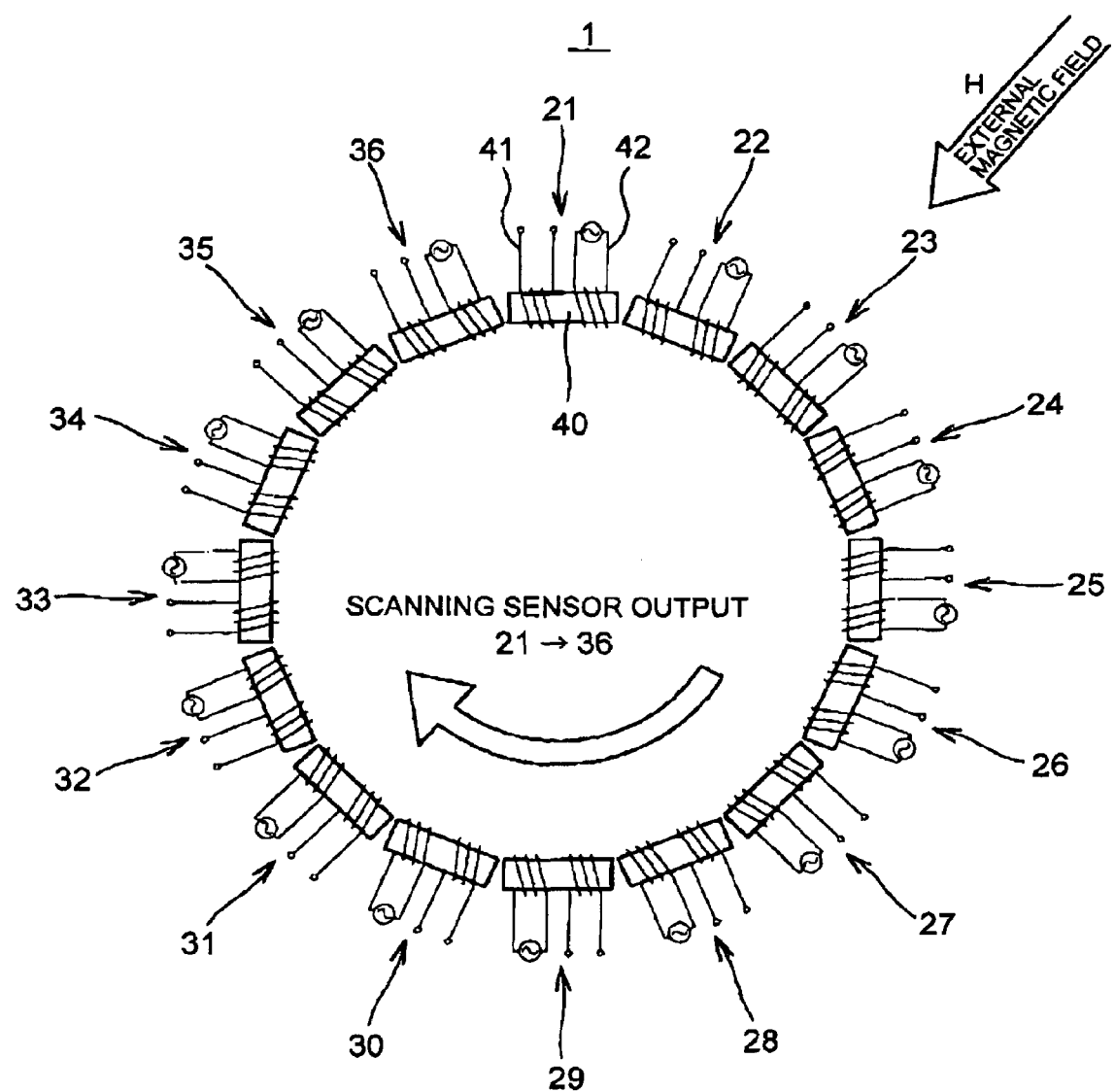
FIG. 3 is an arrangement diagram of a magnetic detection device group used by a magnetic azimuth measurement apparatus.
Figure 4:
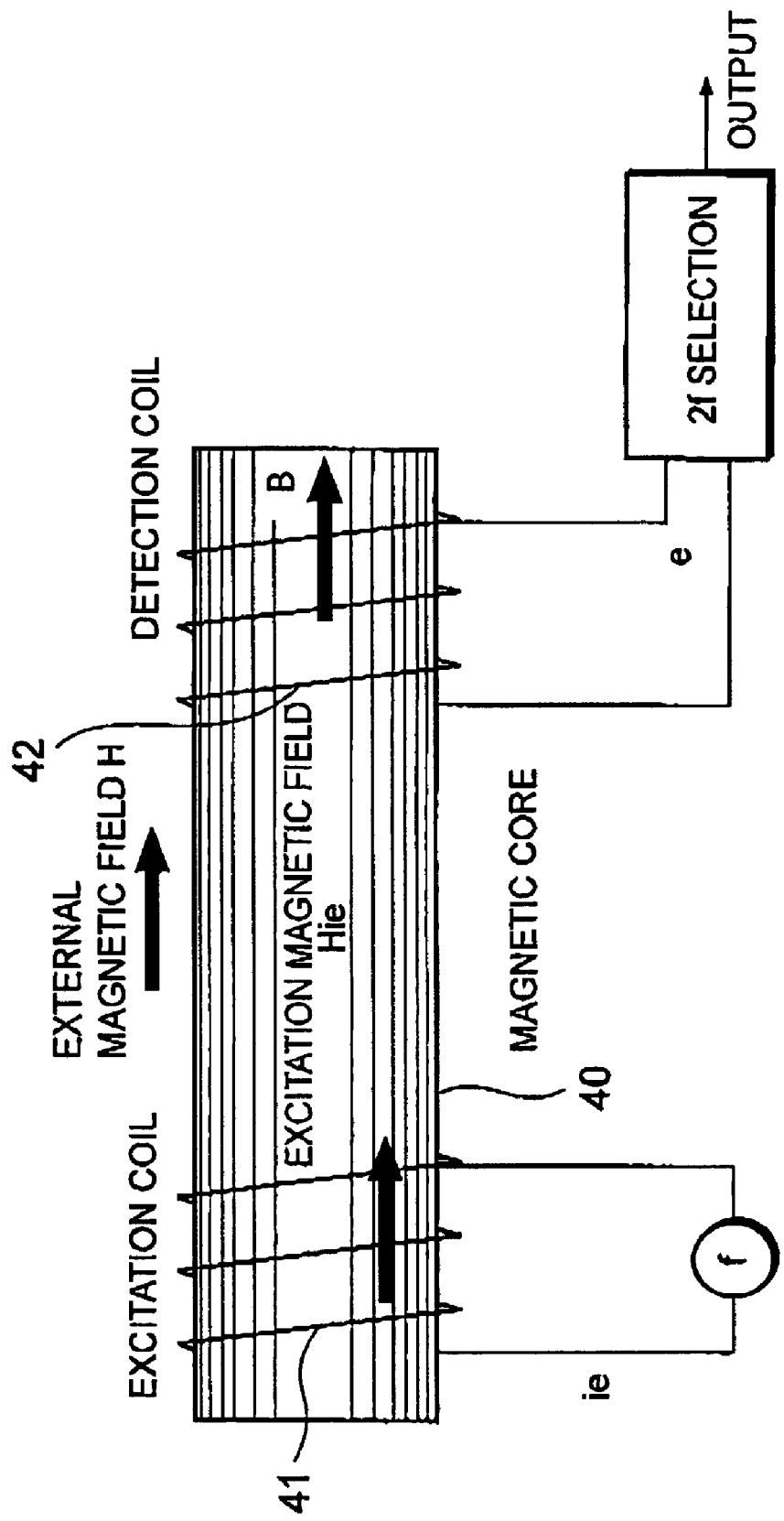
FIG. 4 is a diagram showing a detailed configuration of a magnetic detection device.

As shown in FIG. 3, the magnetic detection device group 1 is constructed by arranging 16 magnetic detection devices 21-36 at equal intervals based on a predetermined rule so that their directionality are different from each another. As shown in FIG. 4, each of the magnetic detection devices 21-36 has a magnetic core 40 of soft magnetic materials, an excitation coil 41 for exciting thereof, and a detecting coil 42 for detecting an external magnetic field. The magnetic detection devices are sensors of the flux gate type.

Figure 5:
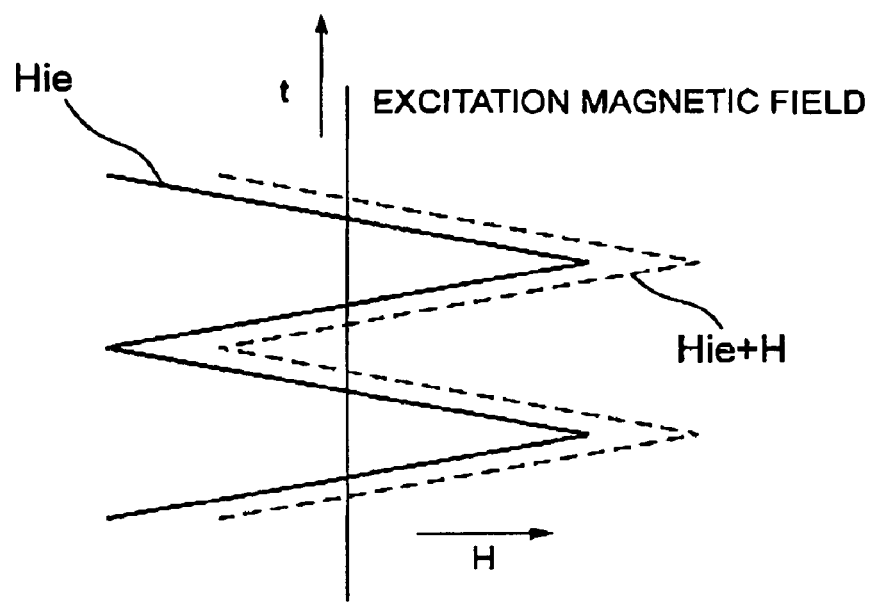
FIG. 5 is a diagram showing fluctuation of an excitation magnetic field.

When a current ie flows into the excitation coil, an excitation magnetic field (magnetic flux) Hie as shown in FIG. 5 is generated in the magnetic core 40. By making the excitation current ie an AC signal, the magnetic flux Hie in the magnetic core 40 also changes alternately with respect to time t, and an inductive voltage e is generated in each detection coil 42 in accordance with the principle of electromagnetic induction. Even if amplitude of the excitation current is made large and magnetizing force is made larger than a certain degree, the flux density B of the magnetic core 40 will not increase as FIG. 6 indicates. The flux density B reaches a saturation state and cases a large distortion in the detection coil inductive voltage e. If a magnetic field H is applied on a magnetic detection device externally at this point, the magnetic flux in the magnetic core becomes the sum of the excitation magnetic flux Hie and the magnetic flux due to the external magnetic field H (i.e. Hie+H). Consequently, depending on the strength of the external magnetic field H, the saturation point of the magnetic core 40 shifts to the positive or negative side as shown in FIG. 7, thereby causing the detection coil inductive voltage e to assume a waveform marked by an asymmetry between the positive and the negative. This is equivalent to the changing of a secondary harmonic component of the inductive voltage. Hence, by subjecting an inductive voltage signal to synchronous detection by a frequency twice the excitation signal, it is possible to sample a voltage change corresponding to the external magnetic field strength H.

Next, the configuration of the switching circuit 2 will be described in detail. As mentioned above, the switching circuit 2 includes the electronic switch unit 3 having 16 electronic switches S1-S16 which read electromagnetic conversion outputs of the 16 magnetic detection devices 21-36 and the encoder 4 generating a digital output to control switching of the 16 electronic switches S1-S16 of the electronic switch unit 3. The switching circuit 2 sequentially switches the outputs of the 16 magnetic detection devices based on digital values in accordance with the number sequence from a hexadecimal counter consisting of $f/2^n$, $f/2^{n+1}$ ... $f/2^{n+m}$ which is supplied from the divider circuit 12.

Next, the configuration of the divider circuit 12 will be described in detail. The divider circuit 12 consists of a binary counter, sampling from a clock CLK terminal a frequency f originating from the oscillator and outputting f/2, $f/2^n$, $f/2^{n+1}$ ... $f/2^{n+m}$. The f/2 signal is supplied to the drive circuit 13. Further, the number sequence 1, 2 ... 16 based on signals of $f/2^n$, $f/2^{n+1}$ ... $f/2^{n+m}$ is supplied to the encoder 4 of the switching circuit 2. Moreover, the divider circuit 12 selectively supplies the number sequence 1, 2 ... 16 based on signals of $f/2^n$, $f/2^{n+1}$ ... $f/2^{n+m}$ to the output interface circuit 9.

Next, the output interface circuit 9 will be described in detail. The output interface circuit 9 has a latch 10, based on the trigger signal from the condition determining circuit 8, holds, for example, a switching signal at its peak, and outputs the azimuth information.

Figure 8:
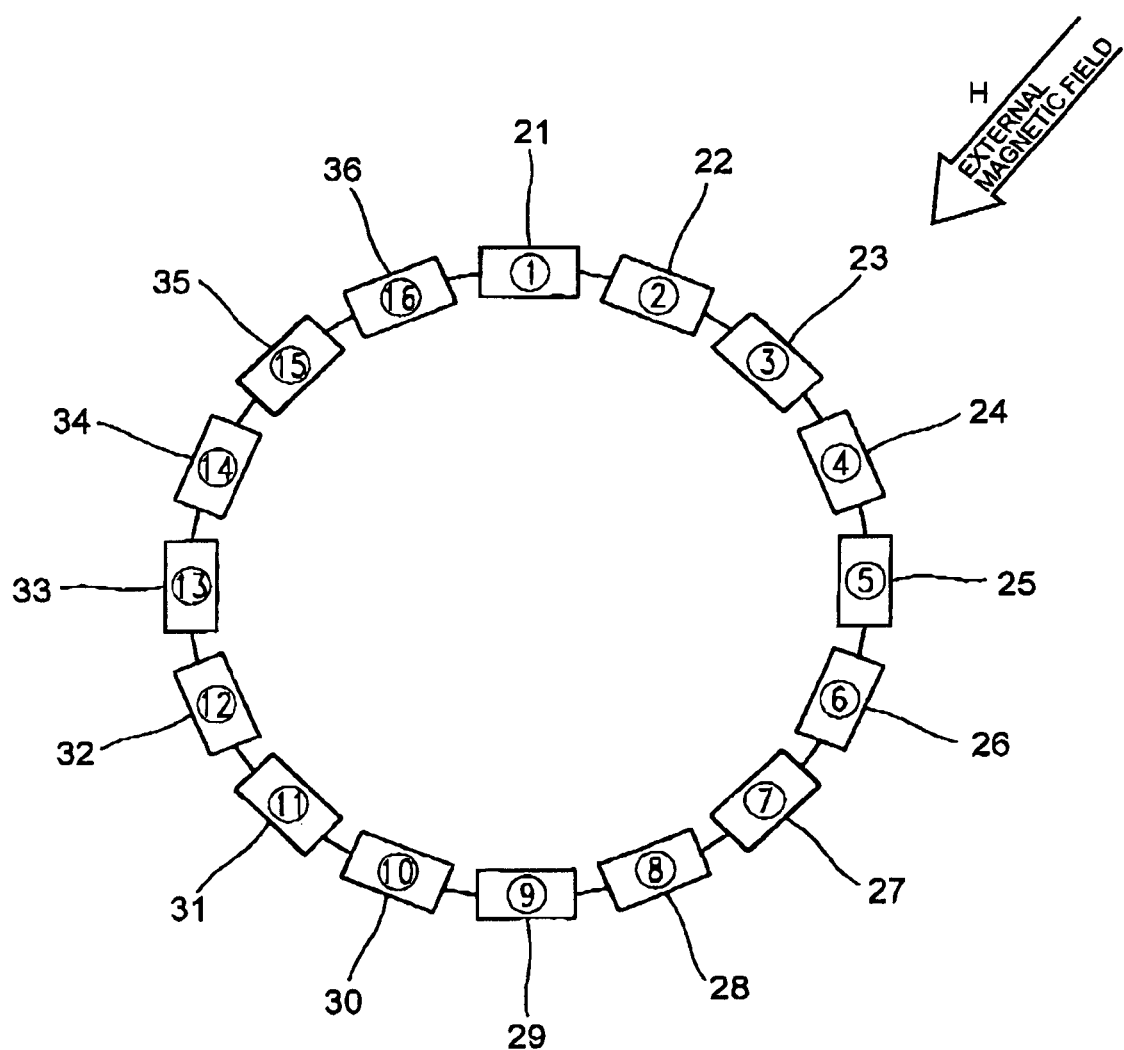
FIG. 8 is a view of magnetic detection devices peripherally arranged.

Next, the operation of the magnetic azimuth measurement apparatus according to the present embodiment will be described in detail. FIG. 8 is a schematic illustration of all of the magnetic detection devices 21-36 of the magnetic detection device group 1. It also shows the external magnetic field H applied in the direction of arrow.

As shown in FIG. 4, a magnetic flux in the soft magnetic material core 40 with respect to the external magnetic field H forms a sine waveform distribution for the azimuth of a core tangent and an external magnetic field direction. In other words, in the vicinity of where the core tangent becomes parallel to the magnetic field, a maximum is obtained, while where the core tangent becomes inversely parallel to the magnetic field, a minimum is obtained. At a section between these two values, consecutive changes occur in the sine waveform. In such a flux distribution, an output from each detection coil is distributed so as to follow the flux distribution in the core at the vicinity of the coil if the detection coil is wound only around the core part and 16 of such detection coils are placed at equal intervals.

Figure 9:
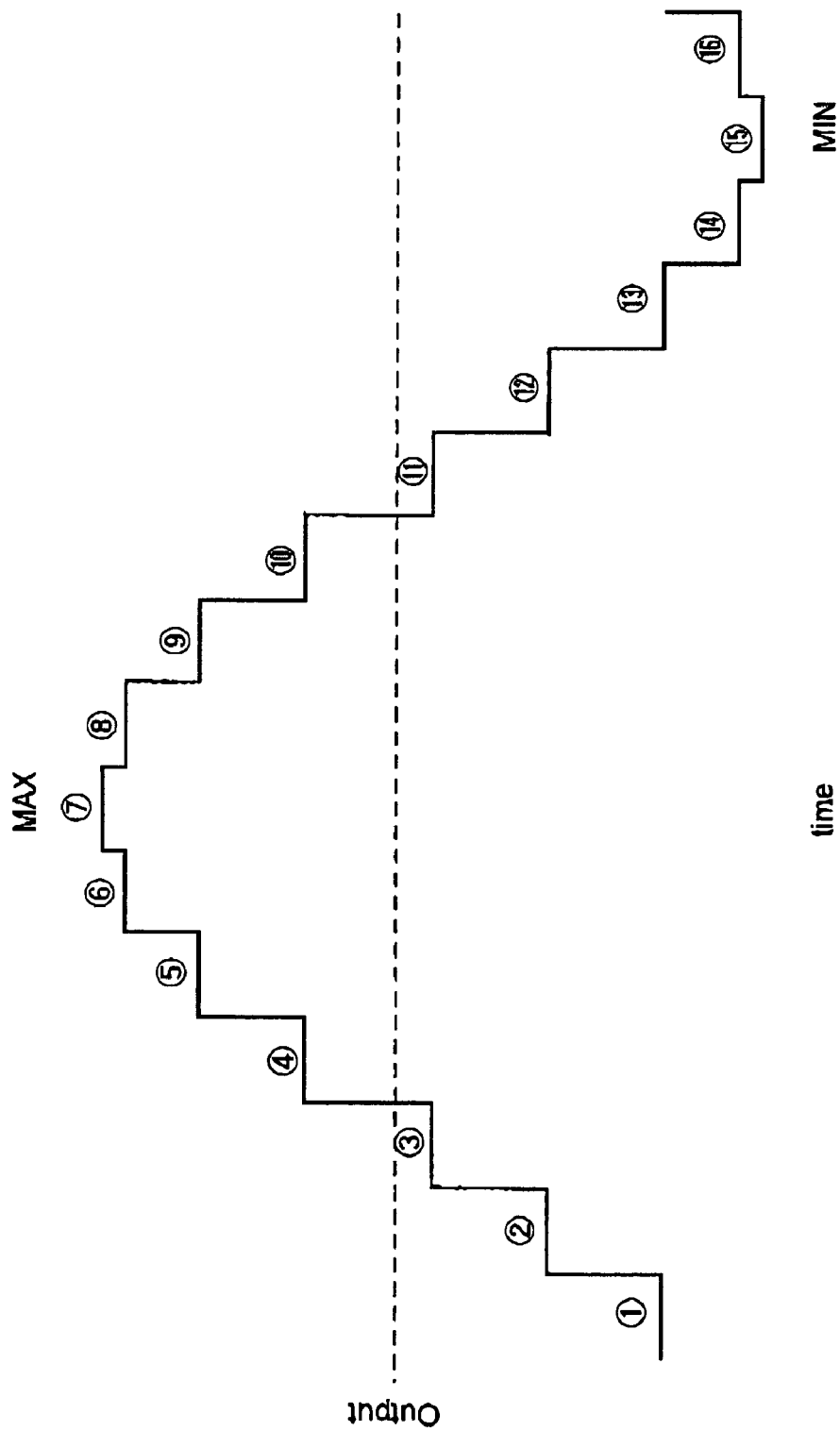
FIG. 9 is a waveform of a scanned output of a magnetic detection device.

When outputs from these detection coils are subjected to sequential switching in terms of time-series by the switching circuit, in accordance with the output distribution due to the above-mentioned coil position (azimuth), signals of the sine waveform changing stepwise relative to time are obtained as shown in FIG. 9.

For this purpose, the switching circuit 2 is placed in between the detection coils and the synchronous detection circuit 5, and sequentially switches the outputs of the detection coils. There is employed a switching method capable of on/off through electric signals per predetermined cycle. As mentioned above, the electronic switches S1-S16 group is switched by digital signals from the encoder 4.

If the number of detection coils are set to $2^n$ (makes it possible to easily configure a circuit digitally), this switching circuit 2 may be easily set up. In other words, an excitation signal is divided by the binary counter (into $f/2^n$, $f/2^{n+1}$ ... $f/2^{n+m}$) to make it an on/off signal of each switch.

This switching signal is in one-to-one correspondence to each detection switch (sensor output). Namely, it corresponds to the position (azimuth) of each detection coil. Accordingly, the sequentially-switched sensor output signal, which becomes a switching signal of a timing under a predetermined condition, becomes a value digitally representing the azimuth of the external magnetic field.

For example, when the condition determining circuit 8 detects that the switched output signal has reached a maximum (positive peak), trigger signal tr is generated, and by the use of the trigger signal tr, the output interface circuit 9 holds a switching signal. The switching signal held by the output interface circuit 9 digitally represents the detection coil position parallel to the external magnetic field H. Accordingly, it becomes possible to detect the azimuth of the external magnetic field H relative to the sensor device.

For example, in FIG. 9, the output of the magnetic detection device 27 becomes the maximum MAX, and the number of device detecting the maximum "7" (azimuth) is outputted directly as a digital value (for example "0111").

As described above, the magnetic azimuth measurement apparatus according to the present embodiment includes the switching circuit 2 and the synchronous detection circuit 5 operating as the sampling unit, for sequentially switching and sampling the electromagnetic conversion output of each of the magnetic detection devices 21-36. Thereafter, the condition determining circuit 8 determines whether or not the sampled electromagnetic conversion output meets the predetermined condition, and depending on the result of the determination, the output interface circuit 9, which is the azimuth information output unit, outputs magnetic azimuth information, thereby eliminating the need of an arithmetic unit and mechanical operations such as rotation. Furthermore, simple configuration of the apparatus would not affect its mass production and makes it possible to measure the azimuth in higher precision.

It should be pointed out that the magnetic detection device group employed by the magnetic azimuth measurement apparatus is not limited to the embodiment (magnetic detection device group 1) illustrated in FIG. 3 and other embodiments may be quite adequately used. Several other embodiments of the magnetic detection device group will be described below.

Figure 10:
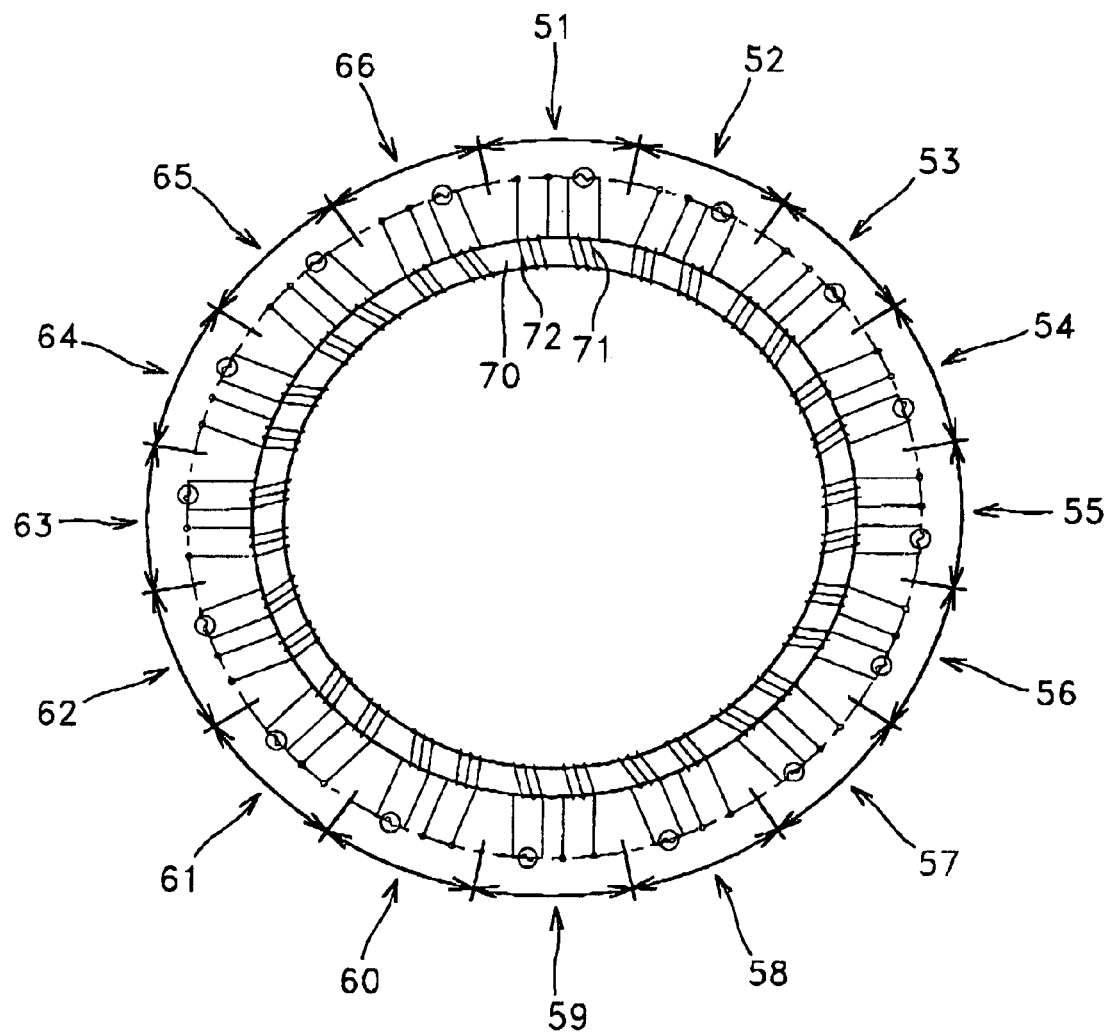
FIG. 10 is an external view of another embodiment of a first magnetic detection device group.

In FIG. 10, there is shown a first specific example of a magnetic detection device group 50 in which 16 magnetic detection devices make common use of one loop-shape magnetic core. Each excitation coil 71 and detection coil 72 are placed at equal intervals. The magnetic core 70 is composed of soft magnetic material.

Figure 11:
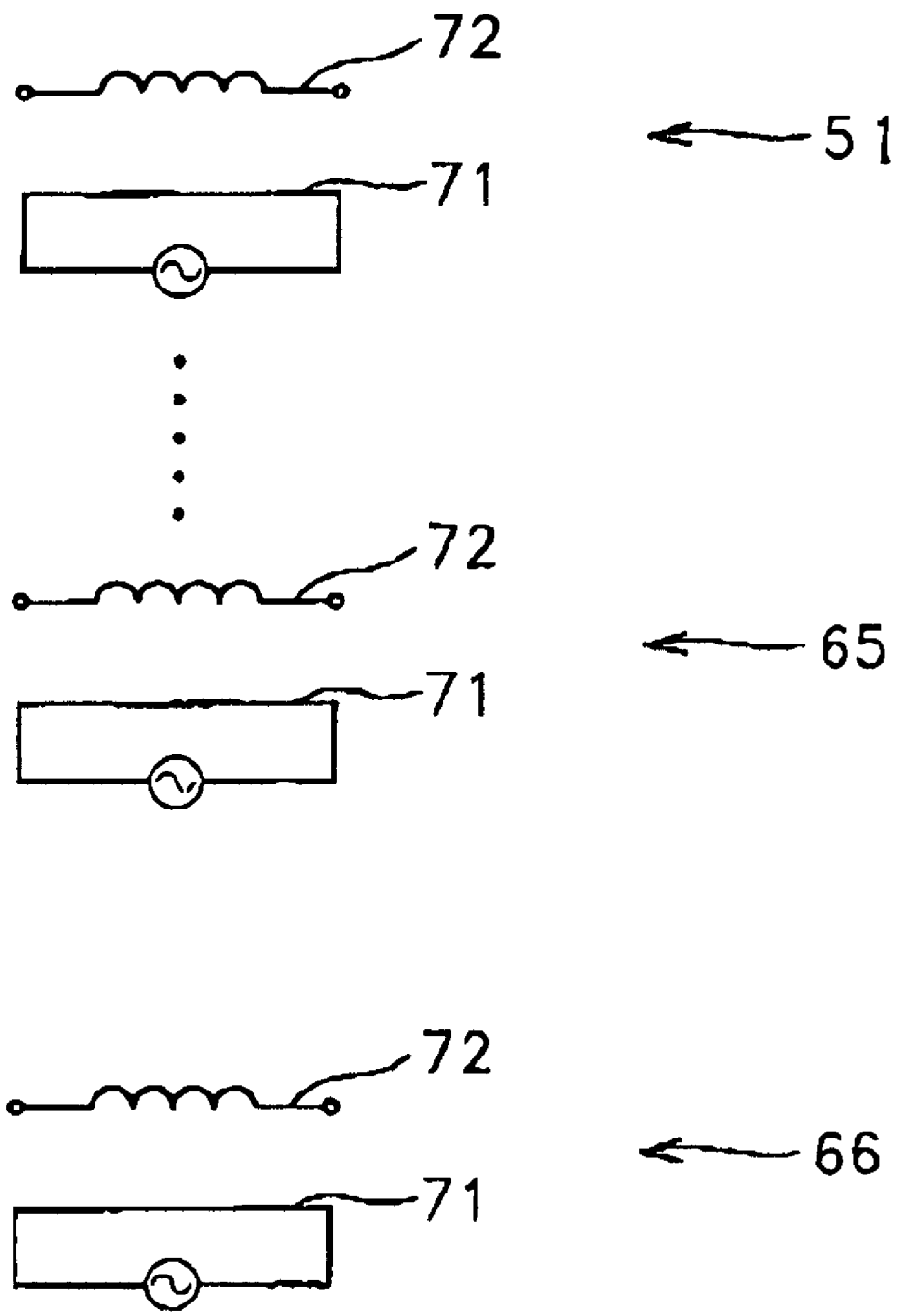
FIG. 11 is an equivalent circuit of another embodiment of a first magnetic detection device group.

Referring to FIG. 10, each of the magnetic detection devices 51-66 forms respective portions that may be determined by equally dividing the common loop-shape magnetic core 70 into 16 portions. The excitation coil 71 and detection coil 72 are wound around the magnetic core 780 per magnetic detection device, and an equivalent circuit thereof is shown in FIG. 11.

Figure 6:
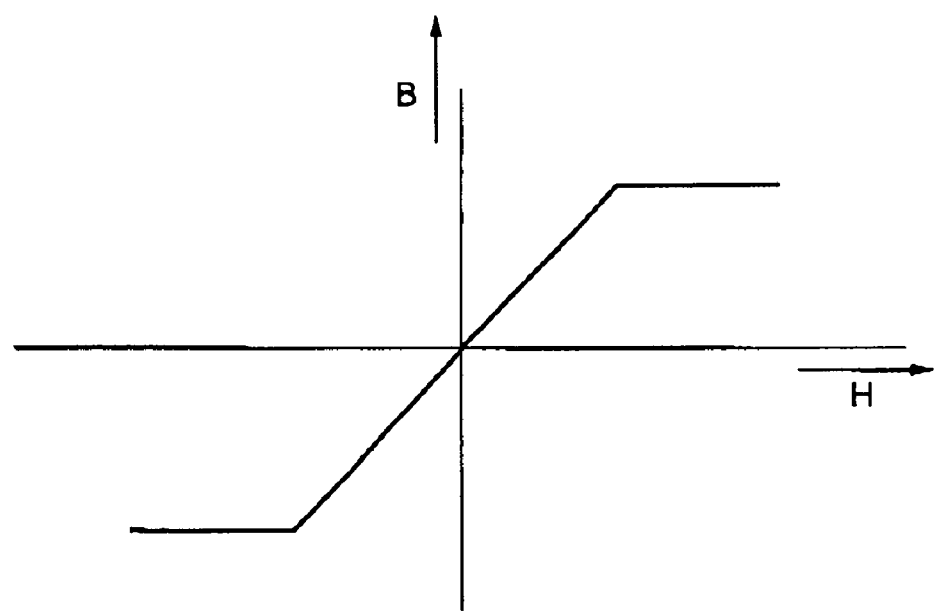
FIG. 6 is a B-H characteristic view of a magnetic core.
Figure 7:
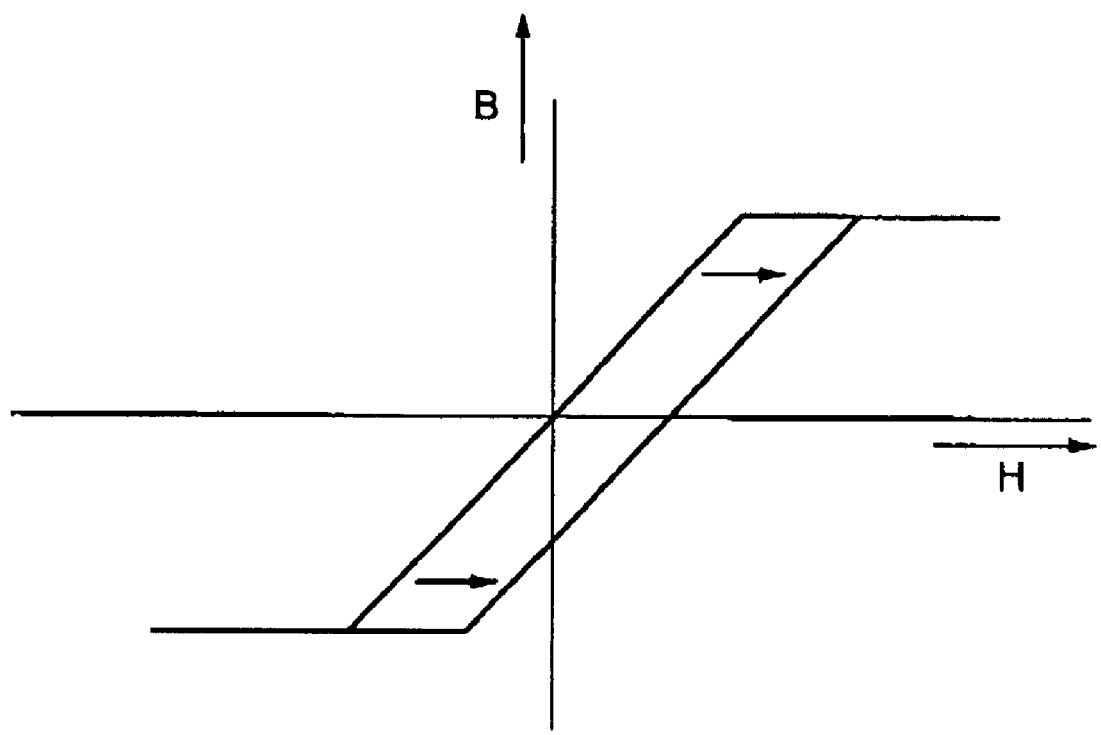
FIG. 7 is a B-H characteristic view of a magnetic core affected by an external magnetic field.

Even in the magnetic detection device group 50, if magnetic force is increased beyond a certain limit as shown in FIGS. 5 to 7, the flux density B of the magnetic core will not increase any more, and reaches the saturation state, thereby greatly distorting the detection coil inductive voltage e. If the magnetic field H is applied from outside, the magnetic flux in the magnetic core becomes the sum of the excitation flux Hie and the magnetic flux due to external magnetic field H (i.e. Hie+H). As a result, according to the strength of the external magnetic field H, the saturation point of the magnetic core shifts to the positive or negative side, and the detection coil inductive voltage e forms a waveform marked by an asymmetry between the positive and the negative.

Accordingly, in the magnetic azimuth measurement apparatus using the magnetic detection device group 50, it is possible to sample a voltage change corresponding to the external magnetic field strength H by subjecting an inductive voltage signal to synchronous detection with a frequency twice the excitation signal.

Further, a magnetic azimuth measurement apparatus according to a second specific example includes a magnetic detection device group 80 whose external appearance is shown in FIG. 12. The magnetic detection device group 80 includes a loop-shape magnetic core that is shared by the 16 magnetic detection devices. Furthermore, the group 80 includes one excitation coil shared by the 16 magnetic detection devices. The detection coil is wound around a magnetic core section 100 for each of the magnetic detection devices 81 to 96.

Figure 13A:
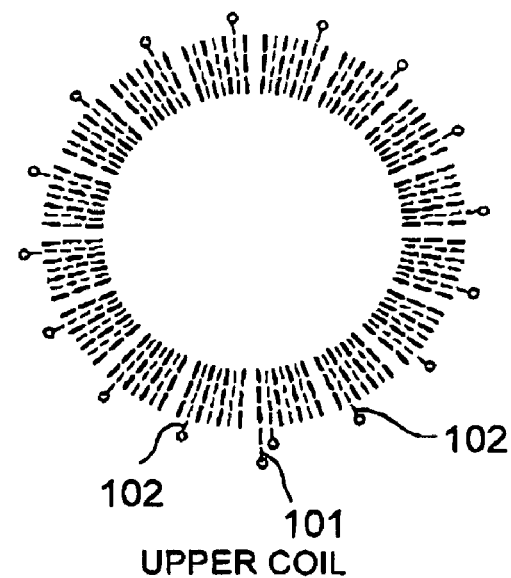
FIG. 13 is an exploded view of another embodiment of a second magnetic detection device group.
Figure 13B:
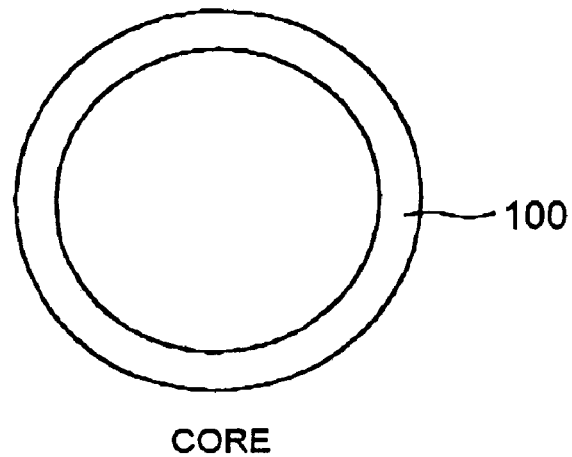
Figure 13C:
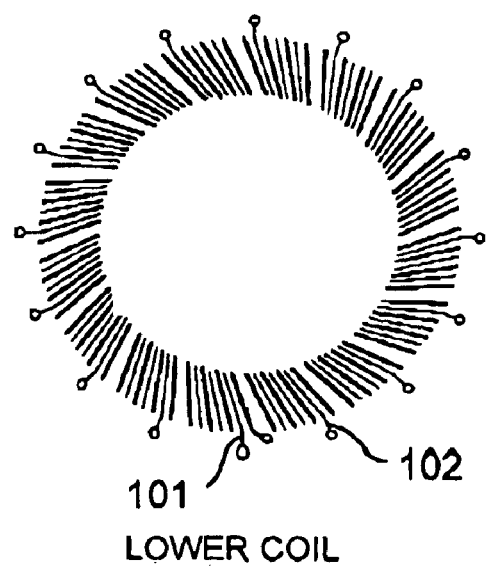
Figure 14:
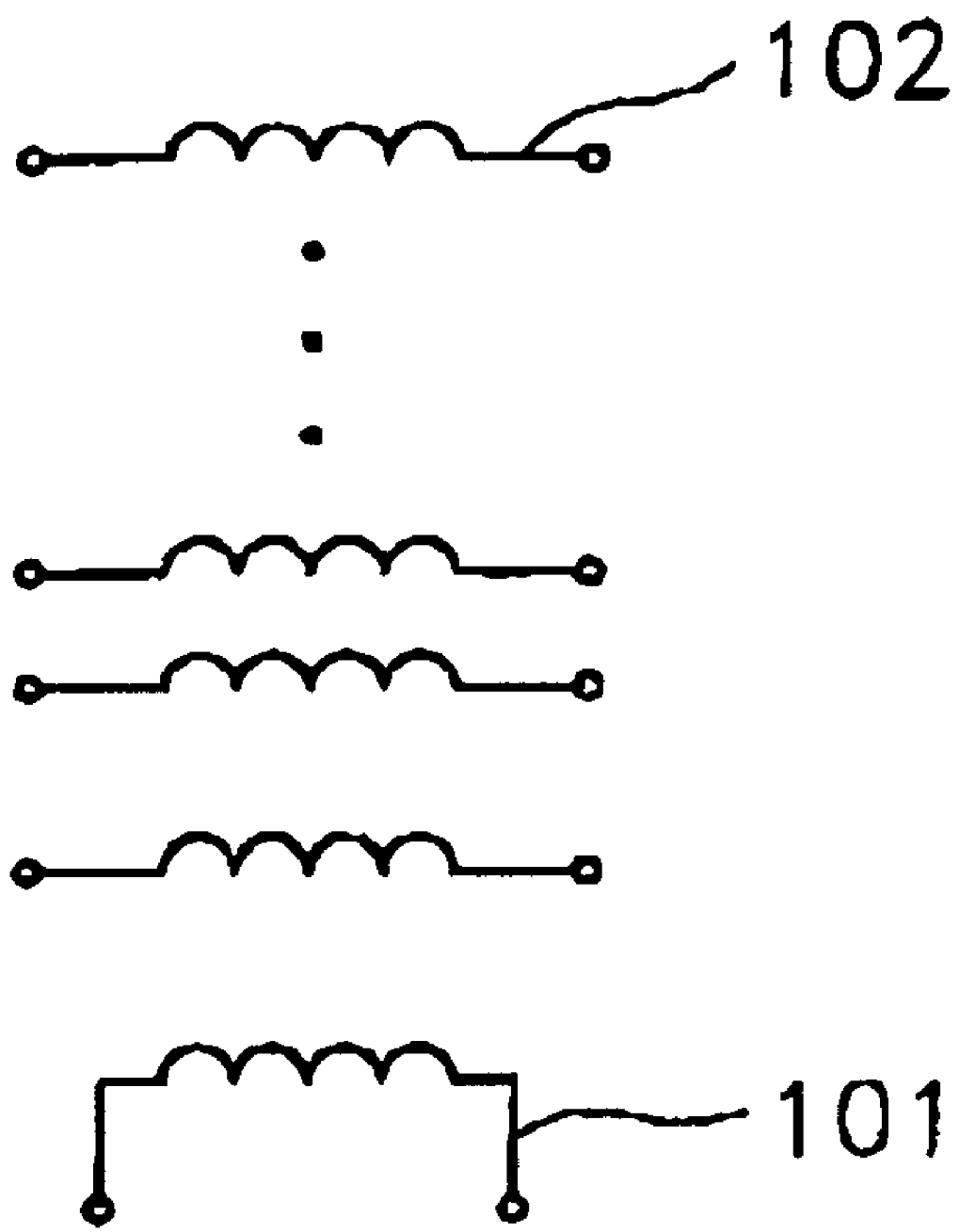
FIG. 14 is an equivalent circuit of another embodiment of a second magnetic detection device group.

Referring to FIG. 12 and FIG. 13, description may be made as follows. Each of the magnetic detection devices 81 to 96 is formed at respective portions which are obtained by dividing the common loop-shape magnetic core 100 into 16 equal portions. Further, the excitation coil 101 is wound around the entire magnetic core consecutively so that it can be used commonly by all magnetic detection devices. An equivalent circuit is shown in FIG. 14. It should be noted that the present embodiment may be configured by forming the magnetic core, the excitation coil, and the detection coil in the form of thin films on a non-magnetic material substrate. FIG. 13 is a diagram showing a detail of the magnetic detection device in the thin film form. An upper coil in FIG. 13A is a coil to be wound on the upper side of the magnetic core of the excitation coil 101 and the detection coil 102. A lower coil in FIG. 13B is a coil wound around the lower side of the magnetic core.

Similarly in the magnetic detection device group 100, if magnetic force is increased beyond a certain limit, the flux density B of the magnetic core will not increase any more, and reaches a saturation state, thereby greatly distorting the detection coil inductive voltage e. If the magnetic field H is applied from outside, the magnetic flux in the magnetic core becomes the sum of the excitation flux Hie and the magnetic flux due to external magnetic field H (i.e. Hie+H). As a result, according to the strength of the external magnetic field H, the saturation point of the magnetic core shifts to the positive or negative side, thereby causing the detection coil inductive voltage e to form a waveform marked by an asymmetry between the positive and the negative.

Accordingly, in the magnetic azimuth measurement apparatus using the magnetic detection device group 80, it is possible to sample a voltage change corresponding to the external magnetic field strength H by subjecting an inductive voltage signal to synchronous detection with a frequency twice the excitation signal. Specifically, the magnetic sensor unit can be formed of a simple configuration by making common use of the excitation coil.

Furthermore, FIG. 15 shows an external appearance of a magnetic detection device group 110 in accordance with a third specific example. In the present specific example, a loop-shape magnetic core is shared by 16 magnetic detection devices, and one excitation coil is shared by the 16 magnetic detection devices. Furthermore, the 16 detection coils have one common end.

Figure 16A:
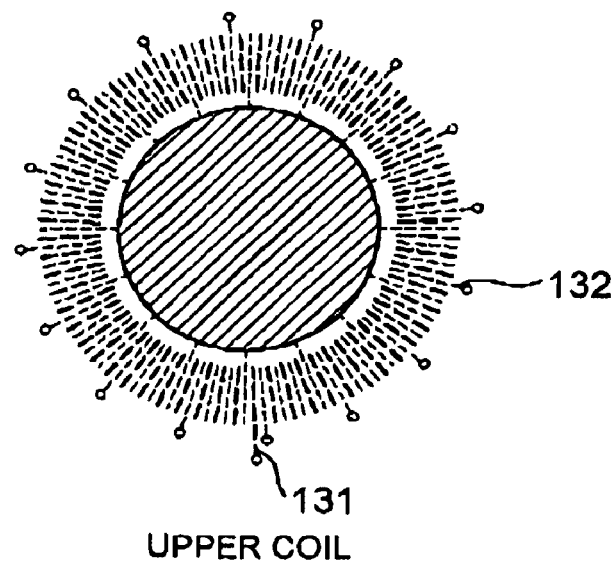
FIG. 16 is an exploded view of another embodiment of a third magnetic detection device group.
Figure 16B:
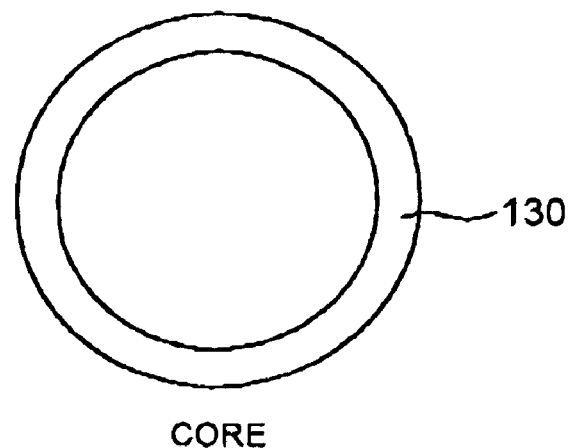
Figure 16C:
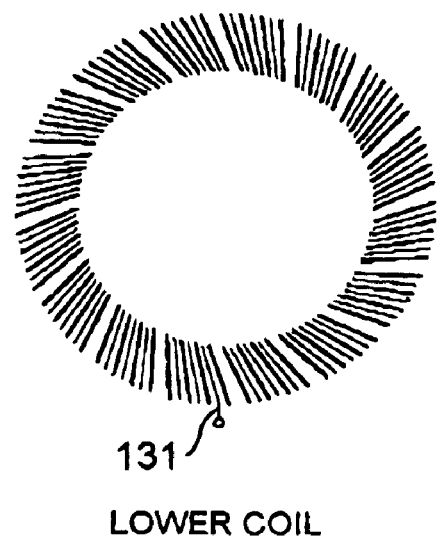
Figure 17:
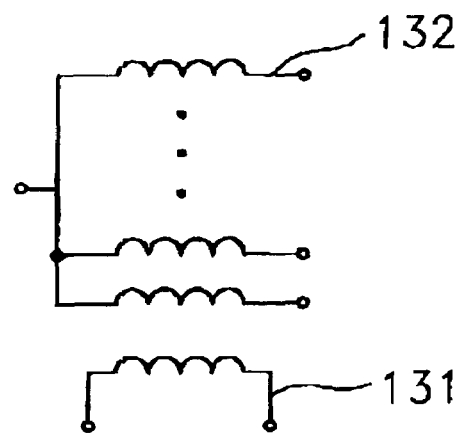
FIG. 17 is an equivalent circuit of another embodiment of a third magnetic detection device group.

Referring to FIG. 15 and FIG. 16, description will be made as follows. Each of the magnetic detection devices 111 to 126 is formed at respective portions which are obtained by dividing the common loop-shape magnetic core 130 into 16 equal portions. Further, the excitation coil 131 is wound around the entire magnetic core consecutively so that it can be used commonly by all magnetic detection devices. An equivalent circuit is shown in FIG. 17. It should be noted that the present specific example, in a similar manner as the second specific example, may also be configured by forming the magnetic core, the excitation coil, and the detection coil in thin film form on a non-magnetic material substrate. FIG. 16 shows a detail of the thin film form device. An upper coil in FIG. 16A is a coil wound on the upper side of the magnetic core of the excitation coil 131 and the detection coil 132. A lower coil in FIG. 16B is a coil wound around the lower side of the magnetic core. An equivalent circuit is shown in FIG. 17.

Similarly, in this magnetic detection device group 110, if magnetic force is increased beyond a certain limit, the flux density B of the magnetic core will not increase any more, and reaches a saturation state, thereby greatly distorting the detection coil inductive voltage e. If the magnetic field H is applied from outside, the magnetic flux in the magnetic core becomes the sum of the excitation flux Hie and the magnetic flux due to external magnetic field H (i.e. Hie+H). As a result, according to the strength of the external magnetic field H, the saturation point of the magnetic core shifts to the positive or negative side, and the detection coil inductive voltage e forms a waveform marked by an asymmetry between the positive and the negative.

Accordingly, in the magnetic azimuth measurement apparatus using the magnetic detection device group 110, it is possible to sample a voltage change corresponding to the external magnetic field strength H by subjecting the inductive voltage signal obtained by the magnetic detecting device group 110 to synchronous detection with a frequency twice the excitation signal. Specifically, the magnetic sensor unit may be of a simple configuration, since the excitation coil is commonly used and one ends of the 16 detection coils are commonly used.

Figure 18:
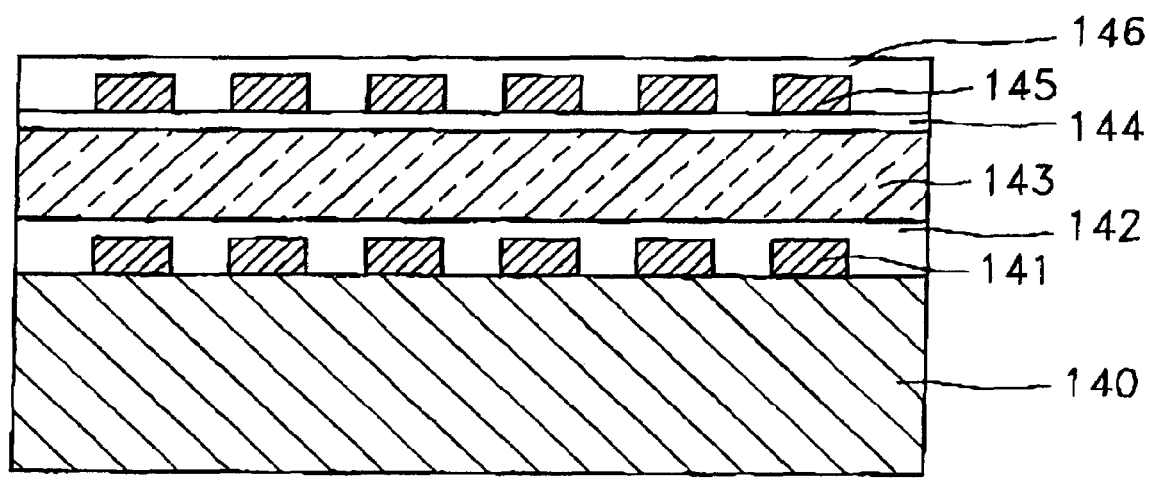
FIG. 18 is a diagram for explaining formation of amagnetic detection device by means of a thin film process.

The second and third specific examples are suited for being formed by the thin film process. The thin film process of each magnetic detection device in this case will be described below with reference to FIG. 18.

First, on a substrate 140 composed of nonmagnetic materials such as Si, Cu is plated, for example, for a thickness of 2 µm to form a lower coil 141. This lower coil 141 is connected to an upper coil 145 to be explained later and woulnd around a magnetic core 143 in a spiral manner. On parts of the upper portions of the lower coil 141 and the substrate 140, there is a coil insulating layer 142 to protect the lower coil 141 and provide insulation of the lower coil 141 and the magnetic core 143. The insulating layer 142 is formed, for example, by thermosetting a photo-resist.

On the coil insulating layer 142, there is formed a magnetic core 143 by lifting off, for example, a Co amorphous alloy. The Co amorphous alloy is a material to which inductive magnetic anisotropy can be provided and from which such anisotropy can be removed by heat treatment and application of a magnetic field.

Furthermore, on the magnetic core 143, there is a coil insulating layer 144 to insulate the magnetic core 143 and the upper coil 145 to be explained later. The insulating layer 144 is formed, for example, by thermosetting a photo-resist.

On the coil insulating layer 144, Cu is plated, for example, for a thickness of 2 µm to form the upper coil 145 in a similar way for the above-mentioned lower coil 141. And on the upper coil 145 and on part of the coil insulating layer 144, there is a protective layer 146 to protect the upper coil 145. The insulating layer 146 is formed, for example, by thermosetting a photo-resist.

Accordingly, in the magnetic detection device group to be used in the embodiments of the present invention, it is possible to form on the non-magnetic substrate the loop type magnetic core, the excitation coils and the detection coils as described above by the use of the thin film processing.

Further, the magnetic detection device group 1 shown in FIG. 3 is provided with the magnetic devices that are arranged on the circumference of a circle. Alternatively, the magnetic detection device group may be formed on the outer periphery of a polygon. For example, 8 magnetic detection devices may be arranged on the periphery of an octagon or 16 magnetic detection devices may be disposed on the periphery of a hexadecagon.

Figure 19:
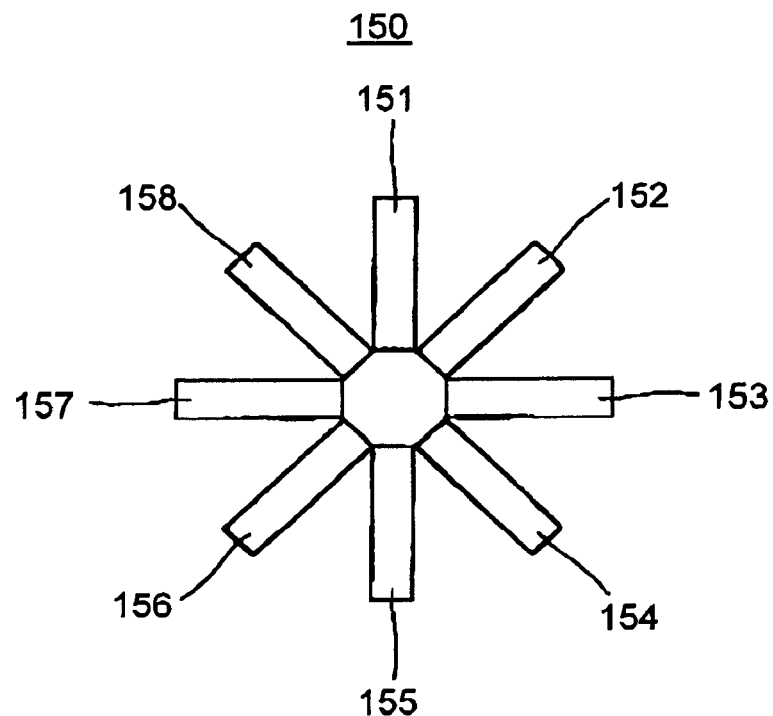
FIG. 19 is a schematic view of still another embodiment of a magnetic detection device group.
Figure 20:
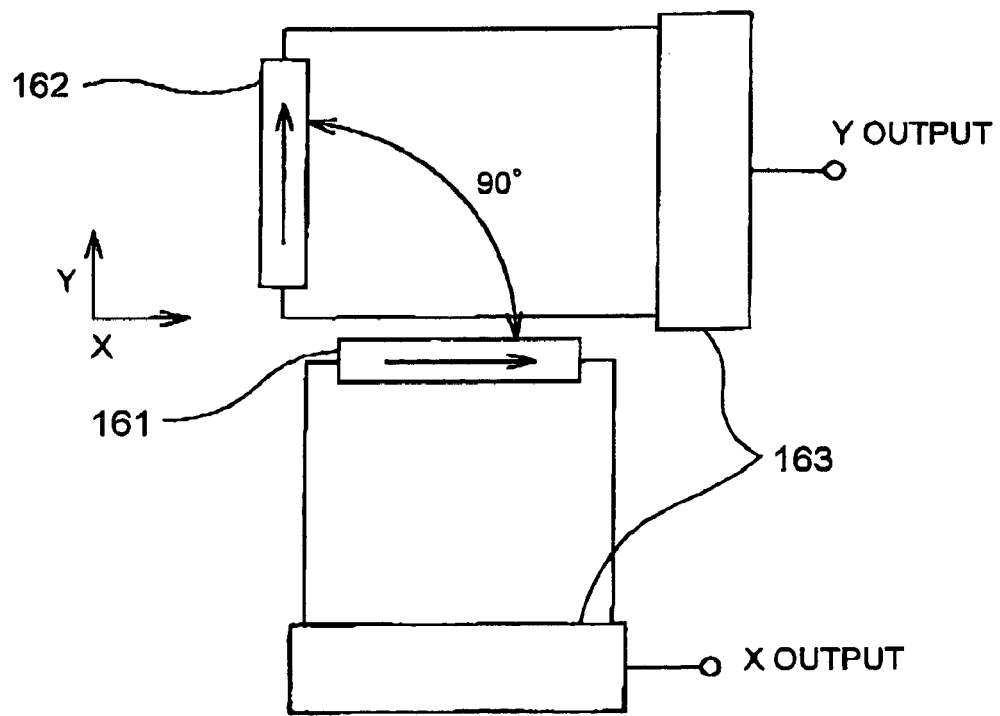
FIG. 20 is a diagram for showing a conventional magnetic detection device.
Figure 21:
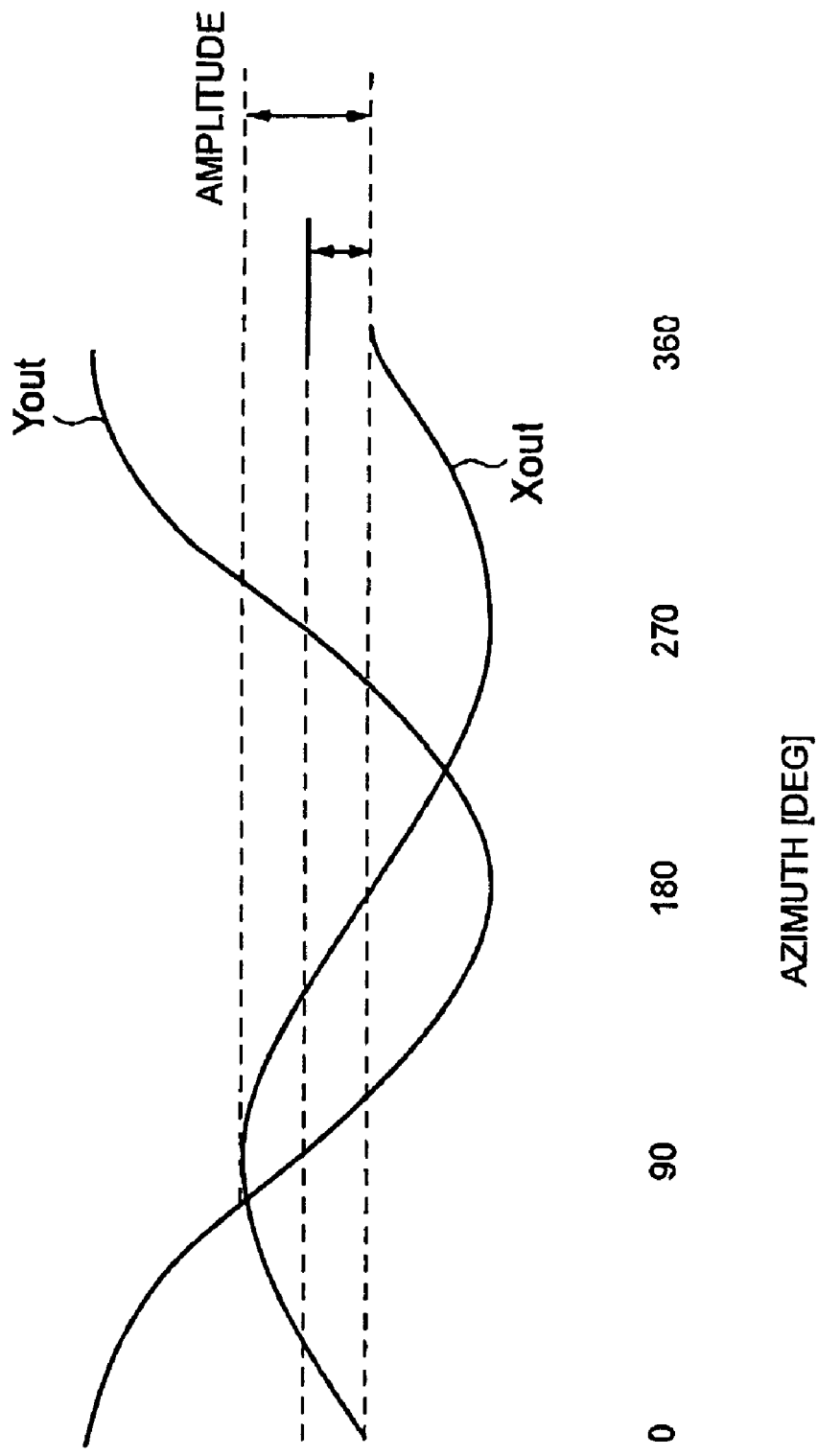
FIG. 21 is an azimuth-output characteristic diagram by a magnetic detection device.
Figure 22:
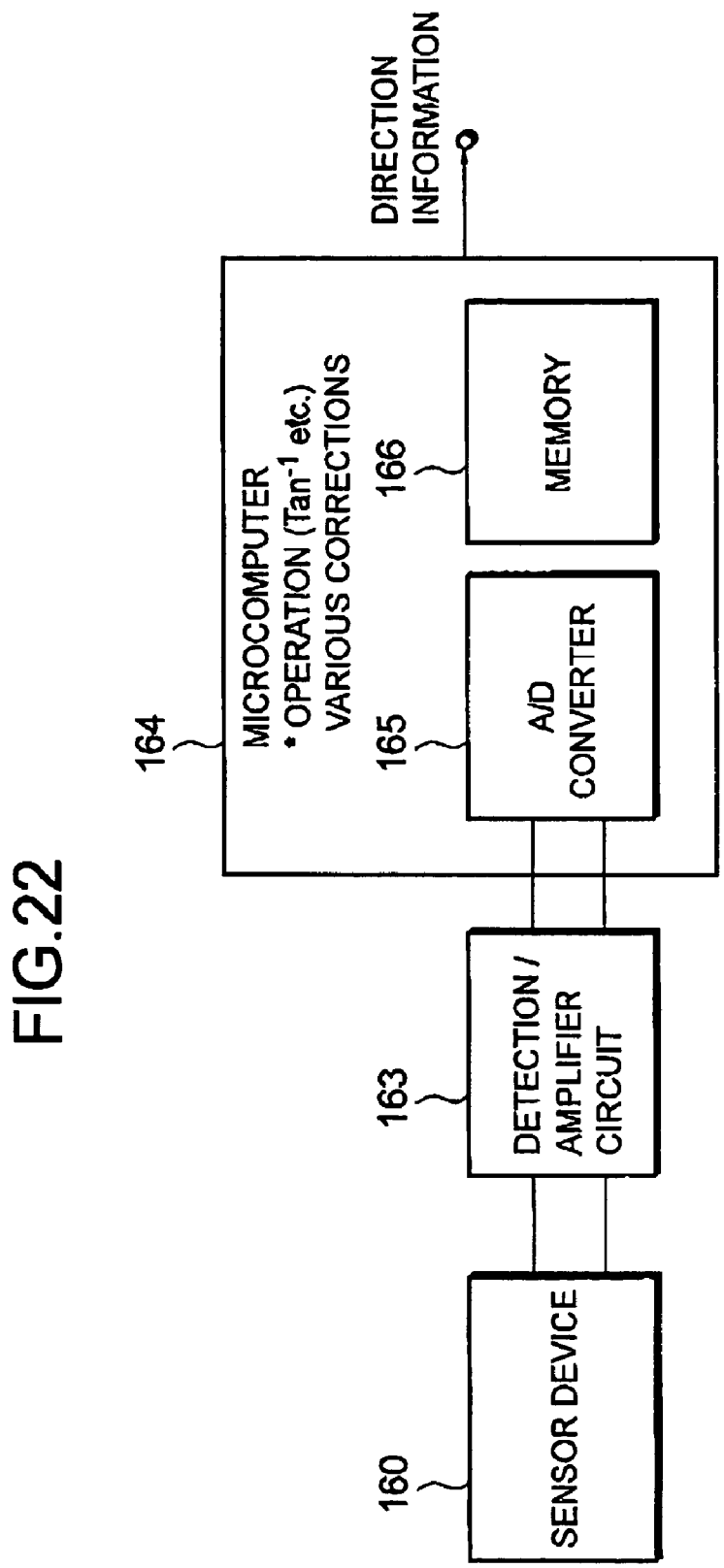
FIG. 22 is a block diagram of a conventional magnetic azimuth measurement apparatus.

Still further, as shown in FIG. 19, a magnetic detection device group 150 with a configuration of 8 magnetic detection devices radially arranged may be used. As shown in FIG. 4, each of the magnetic detection devices 151 to 158 is formed by winding the excitation coil and the detection coil around the magnetic core.

Even in the magnetic detection device group 150, a magnetic detection device parallel to the external magnetic field maximizes an electromagnetic conversion output, so that it may be used for a magnetic azimuth measurement apparatus shown in FIG. 1 above. Naturally, if 16 magnetic detection devices are radially arranged, an azimuth can be accurately measured.

Furthermore, as the above-mentioned predetermined condition for the condition determining circuit 8, in addition to the use of a maximum, for example, a minimum (negative peak) or a predetermined voltage (for example, zero cross point) may be used.

Moreover, as the magnetic detection device group in FIG. 1, in addition to the flux gate, for example, a magnetoresistive device, a magnetic impedance device, a Hall device or the like may be used.

According to the magnetic azimuth measurement apparatus of the present invention, the electromagnetic conversion output from each magnetic detection device of the magnetic detection unit is sequentially switched and sampled by the sampling unit, and the condition determining unit determines whether or not the sampled electromagnetic conversion output meets the predetermined condition. Based on the result of the determination, the azimuth information output unit outputs magnetic azimuth information, thereby eliminating the use of an arithmetic unit and enabling the sampling of high-precision azimuth information with the simple configuration. Further, since there is very little effect due to variations of devices, circuits and the like while high-precision azimuth information can be obtained, thereby making it possible to mass-produce high-performance azimuth measurement apparatus without much technical challenge.

It should be understood by those skilled in the art that various modifications, combinations, sub-combinations and alterations may occur depending on design requirements and other factors insofar as they are within the scope of the appended claims or the equivalents thereof.

What is claimed is:

1. A magnetic azimuth measurement apparatus comprising:
   a magnetic detection unit having three or more magnetic detection devices with directionality, the magnetic detection devices being disposed at equal angnlar intervals based on a predetermined rule in such a way that directionalities thereof are different from each another;
   a sampling unit for sequentially switching and sampling electromagnetic conversion outputs of magnetic detection devices of the magnetic detection unit;
   a condition determining unit for determining whether or not the electromagnetic conversion output being sequentially switched and sampled by the sampling unit meets a predetermined condition; and
   an azimuth information output unit for outputting magnetic azimuth information based on a result of the determination of the condition determining unit,
   wherein,
   each of the three or more magnetic detection devices of the magnetic detection unit comprises a thin film magnetic core, a thin film excitation coil and a thin film detection coil around the magnetic core,
   the three or more magnetic detection devices disposed in a wheel-spoke arrangement with their cores positioned to point along their respective axes from a common point, and
   the sampling unit sequentially operates switches in response to a signal from a binary counter if the number of detection coils of the magnetic detection devices is set to be $2^n$, the number of the switches being the same as that of the detection coils.

2. The magnetic azimuth measurement apparatus according to claim 1, wherein:
   each magnetic azimuth device of the magnetic detection unit comprises a magnetic core made of a soft magnetic material, an excitation coil for exciting thereof, and a detection coil for detecting an external magnetic field.

3. The magnetic azimuth measurement apparatus according to claim 1, wherein:
   in the magnetic detection unit, the thin film excitation coils corresponding to the three or more magnetic detection devices are configured to form one excitation coil shared by the three or more magnetic detection devices.

4. The magnetic azimuth measurement apparatus according to claim 3, wherein:
   in the magnetic detection unit, all the magnetic detection coils have the same one end.

5. The magnetic azimuth measurement apparatus according to claim 1, wherein:
   the excitation coil and detection coil for each of the magnetic detection devices are formed with a two-layer structure.

6. The magnetic azimuth measurement apparatus according to claim 2, 3, or 4 wherein:
   the magnetic core comprises a material that enable provision and elimination of inductive magnetic anisotropy to be carried out with heat treatment in a magnetic field.

7. The magnetic azimuth measurement apparatus according to claim 1, wherein:
   the sampling unit switches electromagnetic conversion outputs of the magnetic detection devices, and performs synchronous detection of a switched signal with a predetermined frequency, thereby sampling a voltage change corresponding to an external magnetic strength.

8. The magnetic azimuth measurement apparatus according to claim 1, wherein:
   the condition determining unit supplies a trigger signal to the azimuth information output unit as a result of determination if the electromagnetic output being sequentially sampled by the sampling unit is a maximum, a minimum, or zero crossing.

9. The magnetic azimuth measurement apparatus according to claim 8, wherein:
   the azimuth information output unit outputs a signal for switching, which is sampled by the sampling unit if the trigger signal is received from the condition determining unit, as information indicating an azimuth of the external magnetic field.

10. A magnetic azimuth measurement apparatus comprising:
    a magnetic detection unit having three or more magnetic detection devices with directionality, the magnetic detection devices being disposed at equal angular intervals based on a predetermined rule in such a way that directionalities thereof are different from each another;
    a sampling unit for sequentially switching and sampling electromagnetic conversion outputs of magnetic detection devices of the magnetic detection unit;
    a condition determining unit for determining whether or not the electromagnetic conversion output being sequentially switched and sampled by the sampling unit meets a predetermined condition; and
    an azimuth information output unit for outputting magnetic azimuth information based on a result of the determination of the condition determining unit,
    wherein,
    each of the three or more magnetic azimuth devices of the magnetic detection unit comprises a thin film radial magnetic core, said magnetic core insulated by an insulating layer and made of a soft magnetic material, a thin film excitation coil, and a thin film detection coil around the magnetic core, the three or more magnetic detection devices disposed in a wheel-spoke arrangement with their cores positioned to point along their respective axes from a common point, and the sampling unit sequentially operates switches in response to a signal from a binary counter if the number of detection coils of the magnetic detection devices is set to be $2^n$, the number of the switches being the same as that of the detection coils.

* * * * *